(12) United States Patent
Sisto

(10) Patent No.: US 10,602,843 B2
(45) Date of Patent: Mar. 31, 2020

(54) FLOATING SHELF APPARATUS

(71) Applicant: Salvatore Sisto, Bradley Beach, NJ (US)

(72) Inventor: Salvatore Sisto, Bradley Beach, NJ (US)

( * ) Notice: Subject to any disclaimer, the term of this patent is extended or adjusted under 35 U.S.C. 154(b) by 0 days.

(21) Appl. No.: 16/104,046

(22) Filed: Aug. 16, 2018

(65) Prior Publication Data
US 2019/0053623 A1    Feb. 21, 2019

Related U.S. Application Data

(60) Provisional application No. 62/546,402, filed on Aug. 16, 2017.

(51) Int. Cl.
| | | |
|---|---|---|
| *A47B 96/06* | (2006.01) | |
| *F16B 5/00* | (2006.01) | |
| *F16B 11/00* | (2006.01) | |
| *A47B 96/02* | (2006.01) | |
| *A47B 95/00* | (2006.01) | |

(52) U.S. Cl.
CPC ............ *A47B 96/06* (2013.01); *A47B 96/028* (2013.01); *F16B 5/0084* (2013.01); *F16B 11/006* (2013.01); *A47B 95/008* (2013.01)

(58) Field of Classification Search
CPC ... A47B 96/067; A47B 96/027; A47B 96/061; A47B 96/066; A47B 96/008; A47B 96/06; A47B 96/028; A47B 95/008; A47F 5/0846; A47F 5/0853; F16B 5/0084; F16B 11/006

See application file for complete search history.

(56) References Cited

U.S. PATENT DOCUMENTS

| | | | | |
|---|---|---|---|---|
| 2,587,912 | A * | 3/1952 | Simpson | A47K 1/08 248/221.11 |
| 2,665,869 | A | 1/1954 | Samuels | |
| 2,754,974 | A * | 7/1956 | Larson | A47L 13/512 211/70.6 |
| 2,947,093 | A * | 8/1960 | Masters | F16B 12/02 434/421 |
| 3,337,172 | A * | 8/1967 | Jackson | A47B 96/068 248/222.51 |
| 3,381,636 | A | 5/1968 | Saiberlich | |
| 3,437,214 | A * | 4/1969 | Sainsbury | A47B 96/067 211/90.04 |

(Continued)

FOREIGN PATENT DOCUMENTS

WO     2015031960 A1     3/2015

*Primary Examiner* — Patrick D Hawn
(74) *Attorney, Agent, or Firm* — Belles Katz LLC

(57) ABSTRACT

A floating shelf apparatus that includes a mounting bracket and a shelf. The mounting bracket is coupled directly to a support surface such as a wall and the shelf is mounted to the support surface to hang the shelf from the support surface. The mounting bracket includes a first portion that is coupled to the wall, a second portion having an S-shape that extends from a first end of the first portion, and a third portion having a linear shape that extends from a second end of the first portion. The shelf includes a ledge portion upon which items may be supported and a mounting portion that facilitates mounting the shelf to the mounting bracket. The mounting portion has a mounting element that interacts with the second portion of the mounting bracket to mount the shelf to the mounting bracket.

20 Claims, 14 Drawing Sheets

(56) References Cited

U.S. PATENT DOCUMENTS

| | | | | |
|---|---|---|---|---|
| 3,507,082 A * | 4/1970 | Heirich | E04F 13/0805 | 52/506.09 |
| 3,669,035 A * | 6/1972 | Grossman | A47B 96/067 | 108/152 |
| 3,675,882 A | 7/1972 | Dibble | | |
| 3,704,675 A * | 12/1972 | Bellasalma | A47B 5/02 | 108/152 |
| 3,848,843 A * | 11/1974 | Levy | A47G 25/0635 | 248/224.51 |
| 3,984,077 A * | 10/1976 | Shine | A47B 96/063 | 248/248 |
| 4,131,203 A * | 12/1978 | Bridges | A47F 5/0025 | 108/32 |
| 4,160,570 A * | 7/1979 | Bridges | A47F 3/00 | 312/245 |
| 4,165,852 A * | 8/1979 | Chervenak | A47B 95/008 | 108/152 |
| 4,215,840 A * | 8/1980 | Babberl | A47F 5/0068 | 248/214 |
| 4,311,295 A * | 1/1982 | Jamar, Jr. | A47G 1/1606 | 248/222.11 |
| 4,352,478 A * | 10/1982 | Loew | A47F 5/0853 | 248/220.31 |
| 4,441,433 A | 4/1984 | Caldwell | | |
| 4,457,436 A * | 7/1984 | Kelley | A47B 95/008 | 211/88.01 |
| 4,669,690 A * | 6/1987 | McEniry | B65B 67/12 | 248/101 |
| 4,720,069 A * | 1/1988 | Bessinger | A47B 96/061 | 211/90.01 |
| 4,765,575 A * | 8/1988 | Bergl | A47B 96/065 | 108/152 |
| 4,817,538 A * | 4/1989 | Michaelsen | A47B 57/34 | 108/108 |
| 4,825,601 A * | 5/1989 | Halverson | A47F 5/0846 | 211/189 |
| 4,843,977 A * | 7/1989 | Bridges | A47B 96/061 | 108/152 |
| 5,050,832 A * | 9/1991 | Lee | A47B 95/008 | 248/222.51 |
| 5,110,080 A | 5/1992 | Rieman | | |
| 5,178,353 A | 1/1993 | Huxtable | | |
| 5,197,703 A * | 3/1993 | Pratolongo | A47B 57/04 | 108/152 |
| 5,332,108 A * | 7/1994 | Blass | A47B 96/067 | 211/90.02 |
| 6,164,610 A * | 12/2000 | Santiago | A47B 96/022 | 211/90.01 |
| 6,837,384 B2 * | 1/2005 | Secondino | A47F 5/0846 | 211/87.01 |
| 7,225,935 B2 * | 6/2007 | Breymaier | A47B 96/067 | 211/103 |
| 7,708,252 B2 | 5/2010 | Vander Berg et al. | | |
| 7,787,190 B2 | 8/2010 | Mitsuda et al. | | |
| 8,376,299 B2 * | 2/2013 | Burkman | A47G 1/16 | 108/42 |
| 8,882,065 B2 * | 11/2014 | Henriott | A47B 96/067 | 160/130 |
| 9,163,415 B2 * | 10/2015 | Nies | A47B 96/061 | |
| 9,185,979 B1 * | 11/2015 | Jenks | A47B 96/066 | |
| 9,521,915 B1 * | 12/2016 | Tanger | A47G 1/1606 | |
| 9,668,576 B2 * | 6/2017 | Trunkle | A47B 95/008 | |
| 2002/0125389 A1 * | 9/2002 | Chu | A47B 96/027 | 248/235 |
| 2005/0247653 A1 * | 11/2005 | Brooks | A47F 5/0846 | 211/94.01 |
| 2006/0197002 A1 | 9/2006 | Dute et al. | | |
| 2008/0224004 A1 * | 9/2008 | Gallien | A47B 96/022 | 248/220.1 |
| 2009/0224119 A1 * | 9/2009 | Heffernan | A47B 96/066 | 248/225.11 |
| 2011/0315647 A1 * | 12/2011 | Andersson | A47B 96/061 | 211/90.01 |
| 2015/0182024 A1 * | 7/2015 | Nies | A47B 96/061 | 108/42 |

* cited by examiner

FLOATING SHELF APPARATUS

BACKGROUND

Shelves may be hung in an interior space for countless different reasons. For example, a shelf may be hung in a living room to display artwork, photographs, trinkets, or the like. A shelf may be hung in a bathroom to support items used for personal hygiene. A shelf may be hung in an office to display items pertaining to the work that is performed by the user of the office. Traditionally, shelves are mounted to a wall by supporting them on brackets that remain visible even after the shelf is mounted thereon. More recently, the concept of floating shelves have become popular whereby the bracket upon which the shelf is supported is hidden from view by the shelf, thereby making it appear as if the shelf is floating or otherwise suspended from the wall. However, floating shelves currently in existence tend to be unable to support a large amount of weight, sometimes causing such shelves to become detached from the wall. Furthermore, such floating shelves are often difficult to install and may not appear as seamless as the consumer desires. Thus, a need exists for a floating shelf apparatus that cures the aforementioned deficiencies.

BRIEF SUMMARY

The present invention is directed to a floating shelf apparatus that includes a floating shelf and a mounting bracket bracket that may be attached to a wall, whereby the floating shelf includes a support surface for supporting external objects.

The invention is directed to a floating shelf apparatus that includes a mounting bracket and a shelf. The mounting bracket is coupled directly to a support surface such as a wall and the shelf is mounted to the support surface to hang the shelf from the support surface. The mounting bracket includes a first portion that is coupled to the wall, a second portion having an S-shape that extends from a first end of the first portion, and a third portion having a linear shape that extends from a second end of the first portion. The shelf includes a ledge portion upon which items may be supported and a mounting portion that facilitates mounting the shelf to the mounting bracket. The mounting portion has a mounting element that interacts with the second portion of the mounting bracket to mount the shelf to the mounting bracket.

In one aspect, the invention may be a floating shelf apparatus comprising: a shelf comprising a ledge portion and a mounting portion, the mounting portion comprising a mounting element and a mounting cavity having an open rear end; a mounting bracket comprising: a first portion having a front surface and a rear surface opposite the front surface, the first portion extending from a first end to a second end along a longitudinal axis, wherein the first portion is configured to couple the mounting bracket to a wall with the rear surface of the first portion facing the wall; a second portion having a first leg that extends from the first end of the first portion in an upward direction that is oblique to the front surface of the first portion; and a third portion extending from the second end of the first portion in a downward direction that is oblique to the front surface of the first portion; and wherein the second and third portions of the mounting bracket are located within the mounting cavity of the mounting portion of the shelf and the mounting element of the mounting portion of the shelf interacts with at least one of the second and third portions of the mounting bracket to mount the shelf to the mounting bracket and hang the shelf from the wall.

In another aspect, the invention may be a floating shelf apparatus comprising: a shelf comprising a ledge portion and a mounting portion, the mounting portion comprising a mounting element; a mounting bracket comprising: a first portion configured to be coupled to a wall with a rear surface of the first portion facing the wall, the rear surface lying in a plane; and a second portion comprising: a first leg extending upwardly from a first end of the first portion in a direction away from the plane and being oblique to the plane; a second leg extending upwardly from the first leg in a direction towards the plane and being oblique to the plane; and a third leg extending from the second leg in a direction away from the plane and being perpendicular to the plane; and wherein the mounting element of the shelf interacts with the third leg of the second portion of the mounting bracket to mount the shelf to the mounting bracket and hang the shelf from the wall.

In yet another aspect, the invention may be a floating shelf apparatus comprising: a shelf comprising a ledge portion and a mounting portion, the mounting portion comprising a mounting element; a mounting bracket comprising: a first portion configured to be coupled to a wall with a rear surface of the first portion facing the wall, the rear surface lying in a plane; and a second portion extending from the first portion and comprising a top surface that is generally perpendicular to the plane, the top surface transitioning into a bent portion that faces the plane and is spaced apart from the plane by a gap; and wherein the mounting element of the shelf comprises a first portion that rests atop the top surface of the second portion of the mounting bracket and a second portion that extends into the gap between the bent portion of the second portion of the mounting bracket and the plane to mount the shelf to the mounting bracket.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
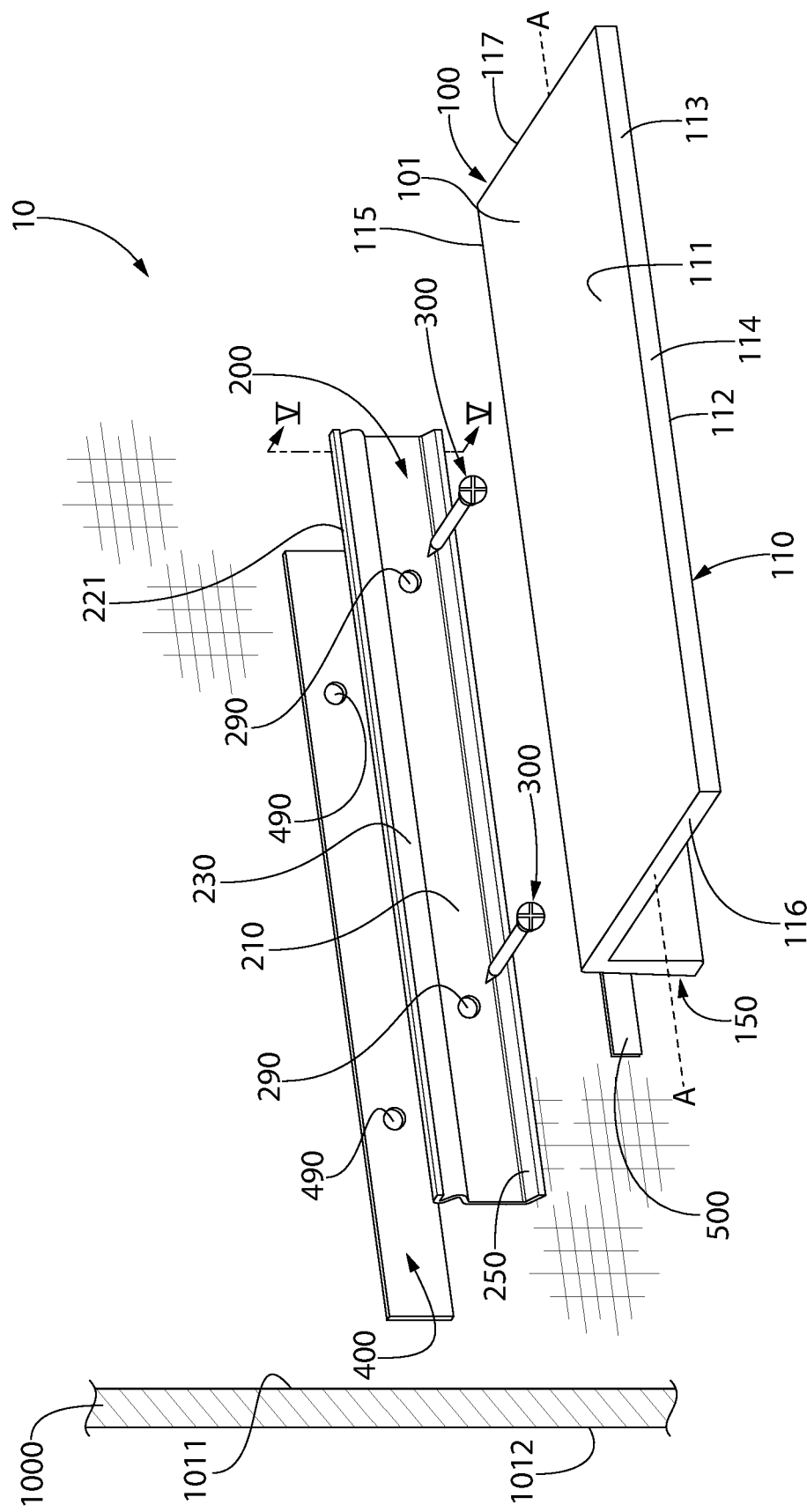
FIG. 1 is an exploded perspective view of a floating shelf apparatus in accordance with an embodiment of the present invention.
Figure 2:
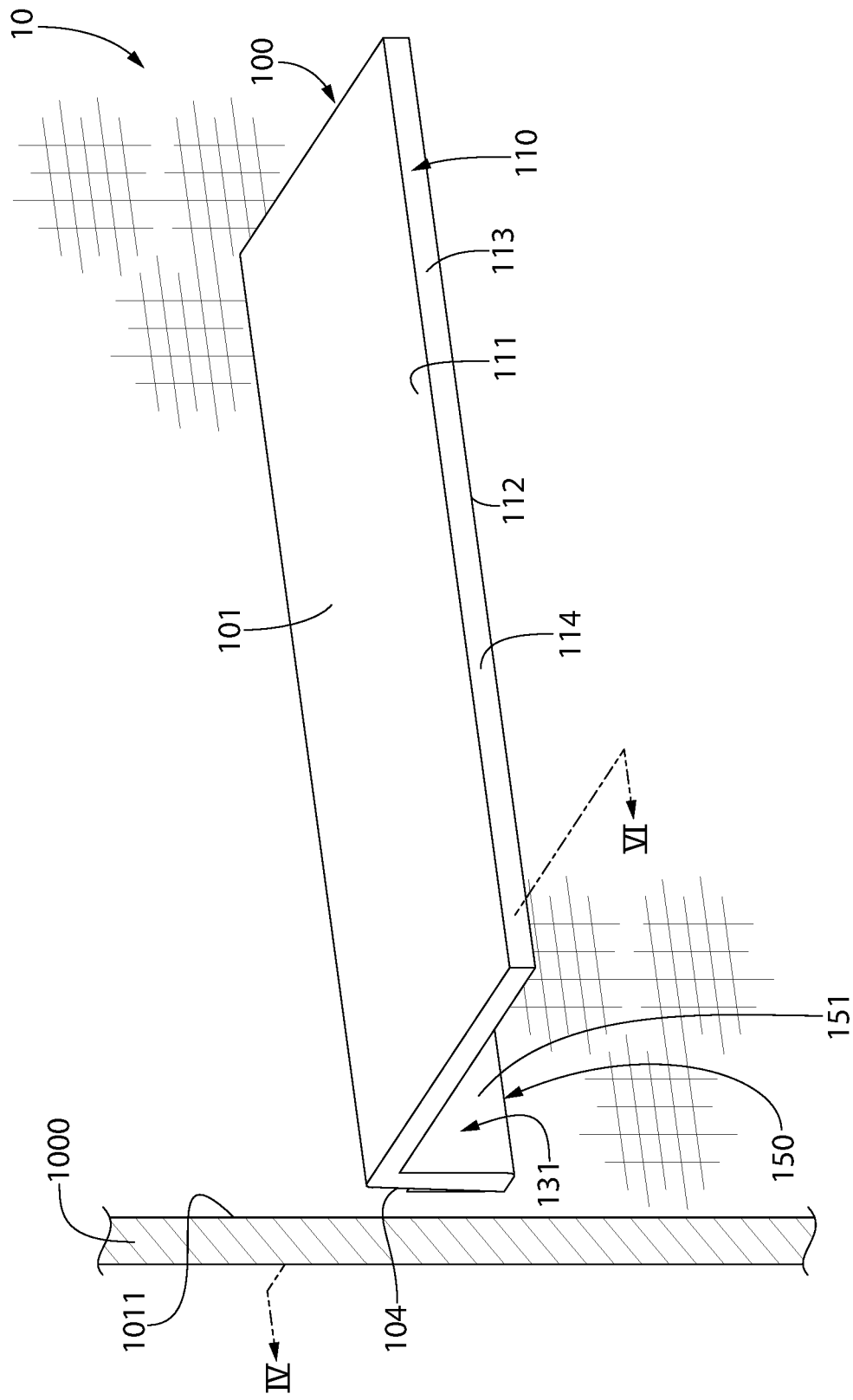
FIG. 2 is perspective view of the floating shelf apparatus of FIG. 1 in an assembled state.
Figure 3:
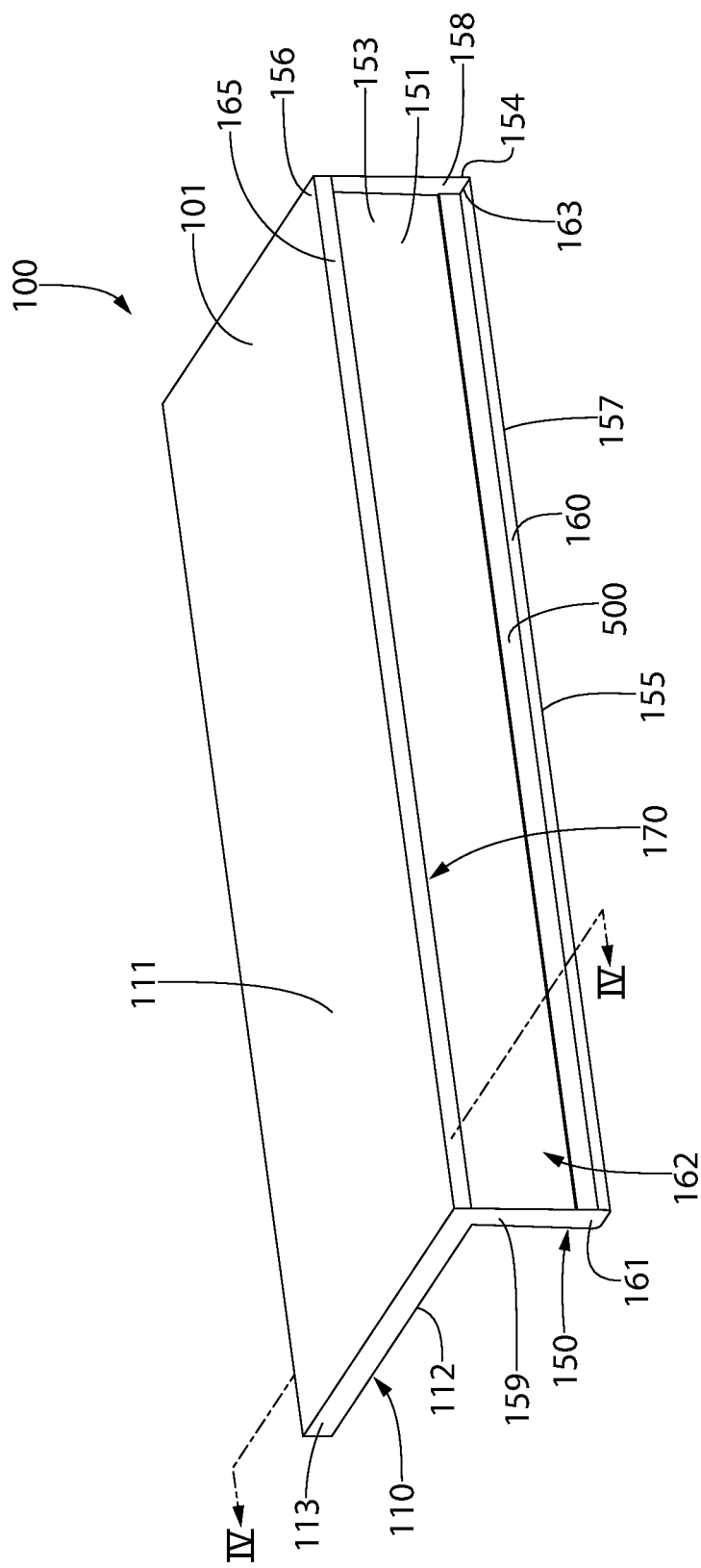
FIG. 3 is a rear perspective view of a shelf of the floating shelf apparatus of FIG. 1.
Figure 4:
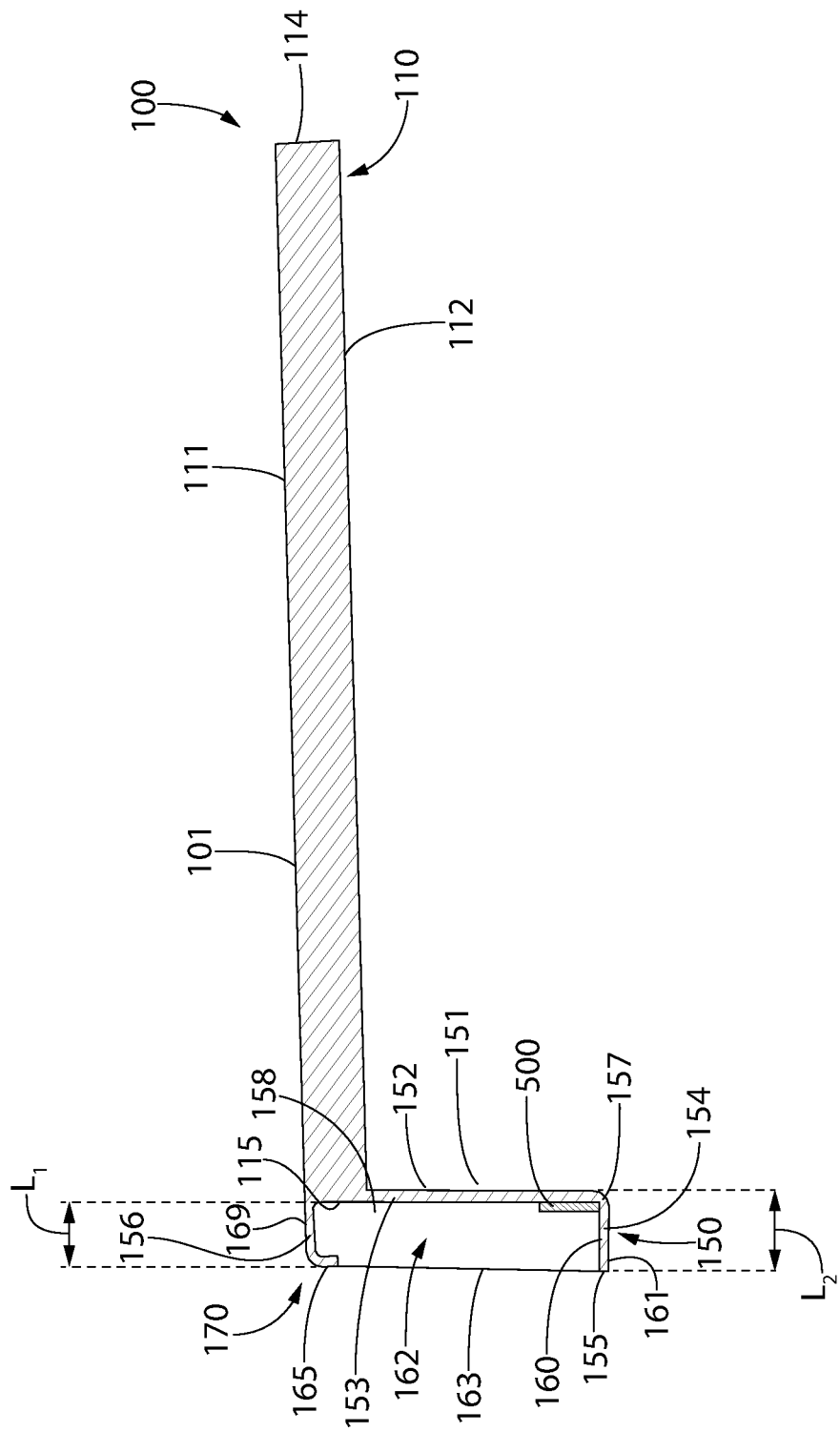
FIG. 4 is a cross-sectional view taken along line IV-IV of FIG. 3.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls. Unless otherwise specified, all percentages and amounts expressed herein and elsewhere in the specification should be understood to refer to percentages by weight. The amounts given are based on the active weight of the material. According to the present application, the term "about" means +/−5% of the reference value.

Referring now to FIG. 1, the present invention is directed to a floating shelf apparatus 10 that comprises a shelf 100 and a mounting bracket 200. In some embodiments, the invention may be directed to the shelf 100 and its structure, in other embodiments the invention may be directed to the mounting bracket 200 and its structure, and in still other embodiments the invention may be directed to the floating shelf apparatus 10 in its entirety, which includes the shelf 100, the mounting bracket 200, and possibly some additional components as described herein.

The floating shelf apparatus 10 may also comprise one or more fasteners 300 and/or a first adhesive component 400 for coupling the mounting bracket 200 to a support surface such as a wall 1000. In some embodiments the one or more fasteners 300 may be used without the first adhesive component 400, in other embodiments the first adhesive component 400 may be used without the one or more fasteners 300, and in still other embodiments both the fasteners 300 and the first adhesive component 400 may be used. As used herein, the terms "support surface" and "wall" may refer to any interior wall-like surface whether it be formed from drywall, gypsum board, plasterboard, or the like. Furthermore, the "support surface" or "wall" may include tile or other decorative features thereon and the floating shelf apparatus 10 may be coupled thereto without having to remove the tile or decorative elements. In some embodiments, the support surface or wall is a vertical surface, although this is not required in all embodiments. The support surface or wall may be a wall surrounding a shower or bathtub or another wall located within a bathroom. However, the invention is not to be limited to the location at which the floating shelf apparatus is hung; rather, the above are merely provided for example only.

Thus, the floating shelf apparatus 10 may be attached to a wall 1000, whether the wall 1000 is bare, covered with paint, covered with tile, covered with other decorative features, or the like. The wall 1000 may comprise a first surface 1011 and a second surface 1012 opposite the first surface 1011. The first surface 1011 is the surface of the wall 1000 that is exposed and to which the mounting bracket 200 is directly coupled. The second surface 1012 is generally hidden from view. The first and second surfaces 1011, 1012 may be planar and they may be vertical (i.e., perpendicular to the horizon), although this is not required in all embodiments.

In the exemplified embodiment, the first adhesive component 400 is located between the first surface 1011 of the wall 1000 and the mounting bracket 200. This may serve two purposes: (1) to provide for an offset between the mounting bracket 200 and the wall 1000 so that the shelf 100 can more easily mount to the mounting bracket 200; and (2) to waterproof the installation. In the exemplified embodiment, there is an offset between a portion of the mounting bracket 200 and the wall 1000 even when the first adhesive component 400 is not used, as will be discussed in more detail below.

The first adhesive component 400 may be a double-sided adhesive tape such as, for example without limitation, 3M™ VHB™ tape. Of course, any other type of double-sided adhesive tape may alternatively be used. Furthermore, the first adhesive component 400 may be a glue rather than a tape. Moreover, in other embodiments the first adhesive component 400 may be omitted and not used in the floating shelf apparatus 10 as it may not be needed for acceptable operation and use of the floating shelf apparatus 10.

Referring to FIGS. 1-4, the shelf 100 of the floating shelf apparatus 10 will be further described. In some embodiments, the shelf 100 may be formed entirely from metal, such as for example without limitation stainless steel, aluminum, or the like. Of course, the invention is not to be so limited and in other embodiments the shelf 100 could be made from wood, plastic, plastic coated with a metal such as stainless steel, or other materials. Furthermore, although in some embodiments the shelf 100 may be solid, in other embodiments it may be hollow. The shelf 100 generally comprises a ledge portion 110 and a mounting portion 150. The mounting portion 150 is configured to couple the shelf 100 to the mounting bracket 200 and the ledge portion 110 is configured to hold items thereon for display or any other reason. As will be described herein, based on the interaction between the mounting bracket 200 and the mounting portion 150 of the shelf 100, the ledge portion 110 may be oriented perpendicular to the wall 1000 or it may be oriented at a slight upward angle (i.e., 1-5°, or more specifically 1-3° off from perpendicular) so that a front edge of the ledge portion 110 is slightly higher than a rear edge of the ledge portion 110. The purpose of upwardly angling the ledge portion 110 is to prevent items from falling off the shelf 100 when the shelf 100 is used in a wet environment such as a bathtub or shower.

The ledge portion 110 comprises a top surface 111, a bottom surface 112 opposite the top surface 111, and a sidewall surface 113 extending between the top and bottom surfaces 111, 112. The top and bottom surfaces 111, 112 are generally planar and parallel to one another, although it may only be necessary for the top surface 111 and not also the bottom surface 112 to be planar in alternative embodiments because the top surface 111 of the ledge portion 110 forms at least a portion of a support surface 101 of the shelf 100. In still other embodiments the top surface 111 may have a texture or be wavy or the like so that it is also not exactly planar. The sidewall surface 113 includes a front or distal portion 114, a rear or proximal portion 115, and side portions 116, 117 that extend between the front and rear portions 114, 115.

n the exemplified embodiment, the shelf 100 is elongated along a longitudinal axis A-A that extends from one of the side portions 116 of the sidewall surface 113 to the other of the side portions 117 of the sidewall surface 113. When mounted to the mounting bracket 200 and hanging from the wall 1000, the rear portion 115 of the sidewall surface 113 is adjacent to and faces the wall 1000 and the front portion 114 is the distal-most portion furthest from the wall. Furthermore, the top surface 111 of the ledge portion 110 of the shelf 100 may extend generally perpendicularly from the wall 1000 so that items stored thereon will not slide off, even in a wet environment. In some embodiments, the top surface 111 of the ledge portion 110 of the shelf 100 may be oriented at a slight angle θ2 (see FIG. 6C) relative to the wall 1000, such as being angled upwardly thereby forming an acute angle of between 80° and 89°, more specifically between 85° and 89°, and still more specifically between 87° and 89° relative to the front surface 1011 of the wall 1000. This will enhance the ability of the shelf 100 to maintain items thereon without sliding off even under wet conditions (such as when the shelf 100 is hung from a wall in a shower or bath or near a sink).

As noted above, the mounting portion 150 of the shelf 100 is the portion that facilitates the mounting of the shelf 100 to the mounting bracket 200, the details of which will be described below. The mounting portion 150 of the shelf 100 extends from the rear portion 115 of the sidewall surface 113 of the ledge portion 110 of the shelf 100.

The mounting portion 150 of the shelf 100 comprises a vertical wall 151 that extends from the rear portion 115 of the sidewall surface 113 of the ledge portion 110 of the shelf 100. In the exemplified embodiment, the vertical wall 151 extends downwardly from the bottom surface 112 of the ledge portion 110 but does not also extend upwardly beyond the top surface 111 of the ledge portion 110. In other embodiments, an example of which is provided in FIG. 9 which will be described briefly below, the vertical wall 151 may extend upwardly from the top surface 111 of the ledge portion 110 instead of downwardly from the bottom surface 112 of the ledge portion 110. This modification will not affect the operability and function of the floating shelf apparatus 10. The vertical wall 151 has a front surface 152 and a rear surface 153 that is opposite to the front surface 152. The front surface 152 of the vertical wall 151 faces away from the mounting bracket 200 and the wall 1000 and the rear surface 153 of the vertical wall 151 faces the mounting bracket 200 and the wall 1000. The ledge portion 110 of the shelf 100 extends from the front surface 152 of the vertical wall 151. In the exemplified embodiment, the ledge portion 110 extends perpendicularly from the front surface 152 of the vertical wall 151, but it may be oriented at a slight angle in other embodiments.

The mounting portion 150 of the shelf 100 also comprises a sidewall 154 extending from the rear surface 153 of the vertical wall 151 to a distal end 155. The sidewall 154 comprises an inner surface 160 and an outer surface 161. Furthermore, the sidewall 154 comprises an upper portion 156, a lower portion 157, a first side portion 158, and a second side portion 159. In the exemplified embodiment, the upper portion 156 of the sidewall 154 is parallel to the top surface 111 of the ledge 110. Although described herein with each of the portions 156-159 of the sidewall 154 extending from the vertical wall 151, in some embodiments the upper portion 156 may extend directly from the rear portion 115 of the sidewall surface 113 of the ledge portion 110 of the shelf 100. Specifically, the vertical wall 151 may merely extend from the bottom surface 112 of the ledge portion 110 and the upper portion 156 may not be coupled directly to the vertical wall 151. However, for purposes of this application, the vertical wall 151 is considered to extend all the way to the top surface 111 of the ledge portion 110 and the upper portion 156 of the sidewall 154 is considered to extend from the vertical wall 151. Thus, the vertical wall 151 may include the rearmost portion of the ledge portion 110 of the shelf 100.

In some embodiments, the support surface 101 of the shelf 100 is formed collectively by an outer surface 169 of the upper portion 156 of the sidewall 154 and the top surface 111 of the ledge 110. In such embodiments, the outer surface 169 of the upper portion 156 of the sidewall 154 and the top surface 111 of the ledge 110 may be flush with one another. Thus, the outer surface 169 of the upper portion 156 of the sidewall 154 and the top surface 111 of the ledge 110 form a continuous and unbroken surface upon which items can be held. The inner surface 160 of the sidewall 154 and the rear surface 153 of the vertical wall 151 collectively define a mounting cavity 162 of the mounting portion 150 of the shelf 100. Thus, the rear surface 153 of the vertical wall 151 forms a floor of the mounting cavity 162 and the sidewall 154 forms a boundary wall that surrounds the mounting cavity 162. The mounting cavity 162 has an open rear end 163 located at the distal end 155 of the sidewall 154.

The upper portion 156 of the sidewall 154 may have a first length L1 measured from the vertical wall 151 to the distal end 155 and the lower portion 157 of the sidewall 154 may have a second length L2 measured from the vertical wall 151 to the distal end 155. In some embodiments, the second length L2 may be greater than the first length L1. In some embodiments, the difference between the second length L2 and the first length L1 may be between 0.1 mm and 3 mm, more specifically between 0.5 mm and 2.5 mm, and still more specifically between 1 mm and 2 mm.

The mounting portion 150 of the shelf 100 also comprises a mounting element 170 that is configured to interact with a portion of the mounting bracket 200 to mount the shelf 100 to the mounting bracket 200 and thereby hang the shelf 100 from a wall to which the mounting bracket 200 is coupled. In the exemplified embodiment, the mounting element 170 comprises the upper portion 156 of the sidewall 154 and a flange portion 165 that extends from the distal end 155 of the upper portion 156 of the sidewall 154 in a direction into the mounting cavity 162. The flange portion 165 may extend generally perpendicularly from the upper portion 156 of the sidewall 154, although the transition between the upper portion 156 of the sidewall 154 and the flange portion 165 may be formed by a curved surface. Thus, the first mounting element 170 may be generally L-shaped, although there may be some curvature between the linear sections (i.e., the upper portion 156 of the sidewall 154 and the flange portion 165) of the "L."

In the exemplified embodiment, there is a second adhesive component 500 coupled to the rear surface 153 of the vertical wall 151 of the mounting portion 150 of the shelf 100. The shelf 100 may be sold to consumers with the second adhesive component 500 pre-applied thereon with a release liner covering its outer surface Of course, in other embodiments the second adhesive component 500 may be coupled to the shelf 100 after purchase by a consumer.

The second adhesive component 500 may be, similarly to the first adhesive component 400, a double-sided adhesive tape such as, for example without limitation, 3M™ VHB™ tape. Of course, any other type of double-sided adhesive tape or other adhesives may alternatively be used. This includes foam-based double-sided adhesive tape, plastic sheet-based double-sided adhesive tape, glue dots, or the like. Furthermore, the first adhesive component 400 may be a glue rather than a tape in still other embodiments. In the exemplified embodiment, the second adhesive component 500 is located along a lower-most portion of the rear surface 153 of the vertical wall 151 such that a bottom edge of the second adhesive component 500 is in contact with the lower portion 157 of the sidewall 154. Of course, in other embodiments the second adhesive component 500 may be spaced slightly apart from the lower portion 157 of the sidewall 154. However, the second adhesive component 500 should be positioned along a lower portion of the rear surface 153 of the vertical wall 151 to ensure that it is aligned with a portion of the mounting bracket 200, as described in more detail below. Thus, at least a portion of the second adhesive component 500 should be located at a position that is between ¹⁄₁₆ inch and ¼ inch, and more specifically between ¹⁄₁₆ inch and ⅛ inch from the bottom portion 157 of the sidewall 154.

The second adhesive component 500 may extend along an entirety of a length of the vertical wall 151 (in a direction of the longitudinal axis A-A), although this is not required in all embodiments and it could be formed by a plurality of spaced apart adhesive portions, sections, dots, linear segments, or the like. In some embodiments, the second adhesive component 500 may extend from the bottom corner of the mounting cavity 162 (i.e., adjacent to the lower portion 157 of the sidewall 154) to a height of about ¼ inch, although the exact size and dimensions of the second adhesive component 500 are not to be limiting of the present invention in all embodiments. As will be better appreciated from the description below with specific reference to FIGS. 6A-6C, the second adhesive component 500 may prevent accidental disassembly of the shelf 100 from the mounting bracket 200 by forming an adhesive bond therebetween.

Figure 5:
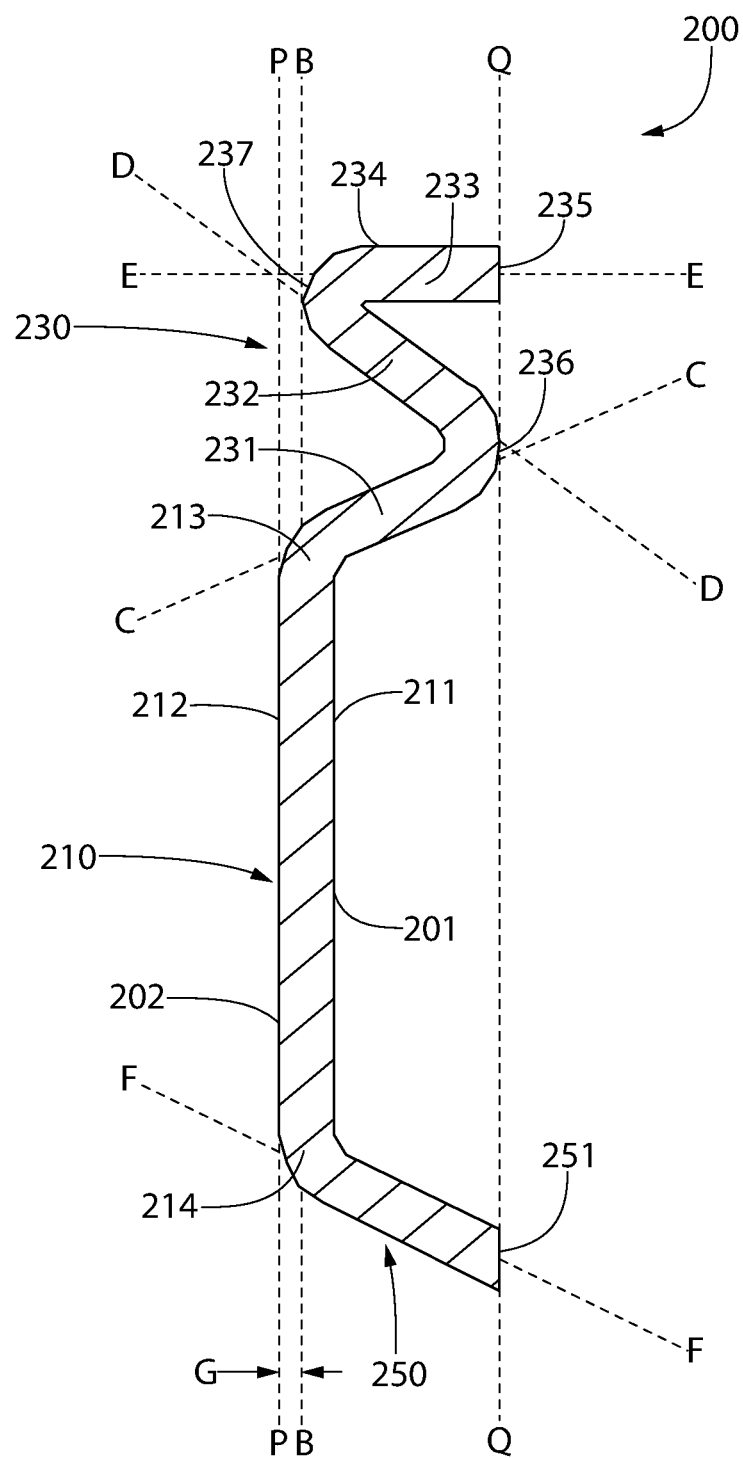
FIG. 5 is a cross-sectional view of a mounting bracket of the floating shelf apparatus taken along line V-V of FIG. 1.

Referring now to FIGS. 1 and 5, the mounting bracket 200 will be described in greater detail. The mounting bracket 200 has a front surface 201 and a rear surface 202 opposite the front surface 201, the rear surface 202 being the surface that faces the wall 1000 when the mounting bracket 200 is coupled to the wall 1000. The mounting bracket 200 comprises a first portion 210, a second portion 230, and a third portion 250. The first portion 210 is the portion that is coupled directly to the wall 1000 (or indirectly via the first adhesive component 400) and the second and/or third portions 230, 250 assist in the mounting of the shelf 100 to the mounting bracket 200. The second and third portions 230, 250 therefore have a very specific structure that aids in the mounting of the shelf 100 to the mounting bracket 200.

The first portion 210 of the mounting bracket 200 comprises a front surface 211 and a rear surface 212 opposite the front surface 211. The front surface 211 of the first portion 210 forms a part of the front surface 201 of the mounting bracket 200 and the rear surface 212 of the first portion 210 forms a part of the rear surface 202 of the mounting bracket 200. In the exemplified embodiment, the front and rear surfaces 211, 212 of the first portion of the mounting bracket 200 are planar and parallel to one another. In other embodiments, the rear surface 212 of the first portion 210 of the mounting bracket 200 may be planar but the front surface 211 may be non-planar. The rear surface 212 of the mounting bracket 200 is the surface that faces the wall 1000 when the mounting bracket 200 is coupled to the wall 1000. Therefore, forming the rear surface 212 to be planar may be desirable to ensure that the first portion 210 of the mounting bracket 200 can be abutted directly against the front surface 1011 of the wall 1000 (or the first adhesive component 400 thereon). The rear surface 212 of the mounting bracket 200 may be in direct contact with the first surface 1011 of the wall 1000 if the first adhesive component 400 is omitted, but if the first adhesive component 400 is included than the rear surface 212 of the mounting bracket 200 is in direct contact with the first adhesive component 400. In the exemplified embodiment, the rear surface 212 of the first portion 210 of the mounting bracket 200 lies in a plane P-P. When the mounting bracket 200 is coupled to the wall 1000, the plane P-P is parallel to the front surface 1011 of the wall 1000.

Furthermore, the first portion 210 of the mounting bracket 200 extends from a first end 213 to a second end 214 along a longitudinal axis B-B. In the exemplified embodiment, the mounting bracket 200 is a monolithic, integral structure formed from metal, although plastic or the like may be used in alternative embodiments. Thus, the first, second, and third portions 210, 230, 250 of the mounting bracket 200 are merely portions of a monolithic structure and the mounting bracket 200 is a unitary structure rather than being formed from separate structures that are coupled together. Of course, the bracket 200 could be comprised of separate structures that are coupled together in alternative embodiments. The mounting bracket 200 should have sufficient strength and rigidity to support the shelf 100 and any items stored thereon without the mounting bracket 200 detaching from the wall 1000 and without the mounting bracket 200 bending or otherwise causing the shelf 100 coupled thereto to bend downwardly under the force of the items stored thereon.

As shown in FIG. 1, the first portion 210 of the mounting bracket 200 may include one or more mounting holes 290 that extend from the front surface 211 to the rear surface 212. Each mounting hole 290 is configured to receive one of the fasteners 300 so that the mounting bracket 200 can be coupled to the wall 1000, thereby attaching the mounting bracket 200 to the first surface 1011 of the wall 1000. In the exemplified embodiment, the fasteners 300 are depicted as nails, however, they could be screws or other items of hardware in other embodiments. Moreover, the fasteners 300 could be omitted if the first adhesive component 400 has sufficient bonding strength to support the weight of the mounting bracket 200, the shelf 100, and any items stored on the shelf 100.

The second portion 230 of the mounting bracket 200 is a generally S-shaped portion that extends upwardly from the first end 213 of the first portion 210 of the mounting bracket 200. Thus, the second portion 230 of the mounting bracket 200 comprises three legs that form the S-shape. Specifically, the second portion 230 of the mounting bracket 200 comprises a first leg 231 that extends upwardly from the first end 213 of the first portion 210 of the mounting bracket 200 in a direction away from the plane P-P, a second leg 232 that extends upwardly from the first leg 231 in a direction towards the plane P-P, and a third leg 233 that extends from the second leg 232 in a direction away from the plane P-P. In the exemplified embodiment, the third leg 233 does not extend upwardly, but instead extends horizontally.

More specifically, the first leg 231 extends at an oblique angle relative to the plane P-P in a direction away from the plane P-P. Thus, the first leg 231 extends along an axis C-C that is oblique to the plane P-P. In some embodiments, the angle formed between the plane P-P and the axis C-C may be between 35° and 55°, and more specifically between 40° and 50°, and more specifically approximately 45°, although other ranges are possible. The second leg 232 extends from the first leg 231 back towards the plane P-P and the second leg 232 is also oblique to the plane P-P. Thus, the second leg 232 extends along an axis D-D that is oblique to the plane P-P. In some embodiments, the angle formed between the plane P-P and the axis C-C may be between 35° and 55°, and more specifically between 40° and 50°, and still more specifically approximately 45°, although other ranges are possible. Furthermore, an angle formed between the axis C-C and the axis D-D may be between 85° and 95°, and more specifically approximately 90°. The third leg 233 extends from the second leg 232 in a direction away from the plane P-P and is generally perpendicular to the plane P-P. Thus, the third leg 233 extends along an axis E-E that is generally perpendicular to the plane P-P. An angle formed between the axis E-E and the axis D-D may be between 40° and 50° in some embodiments.

The third leg 233 has a top surface 234 that forms a top surface of the second portion 230 of the mounting bracket 200, which is also a top surface of the mounting bracket 200. In the exemplified embodiment, the top surface 234 of the third leg 233 is planar and is perpendicular to the plane P-P. The third leg 233 terminates at a distal end 235. In the exemplified embodiment, the distal end 235 forms a surface that is parallel to the plane P-P.

The second portion 230 of the mounting bracket 200 does not have pointed corners at the junctions of the first, second, and third legs 231, 232, 233. Rather, the second portion 230 of the mounting bracket 200 has a first bent portion (or curved portion) 236 as the junction of the first and second legs 231, 232 and a second bent portion (or curved portion) 237 at the junction of the second and third legs 232, 233. The first bent portion 236 is a convex portion of the front surface 201 of the mounting bracket 200 and the second bent portion 237 is a convex portion of the rear surface 202 of the mounting bracket 200. In the exemplified embodiment, the first bent portion 236 and the distal end 235 of the third leg 233 lie in a common plane Q-Q. However, in other embodiments the first bent portion 236 could be recessed relative to the plane Q-Q without affecting the function of the floating shelf apparatus 10.

The second bent portion 237 faces the plane P-P in which the rear surface 212 of the first portion 210 of the mounting bracket 200 lies. Thus, when the mounting bracket 200 is coupled to the wall 1000, the second bent portion 237 faces the wall 1000. However, the second bent portion 237 (and specifically an apex thereof) is spaced apart from the plane P-P (and hence also the wall 1000) by a gap G. The apex of the second bent portion 237 may be aligned with the axis B-B of the first portion 210 of the mounting bracket 200 in some embodiments, although this is certainly not required in all embodiments so long as the apex of the second bent portion 237 is offset or otherwise spaced apart from the plane P-P.

In the exemplified embodiment, the third portion 250 of the mounting bracket 200 is a linear portion that extends downwardly from the second end 214 of the first portion 210 in a direction away from the plane P-P. The third portion 250 extends along an axis F-F that is oblique to the plane P-P. The third portion 250 terminates at a distal end 251. In the exemplified embodiment, the distal end 251 forms a surface that is parallel to the plane P-P and that lies in the plane Q-Q, although this is not required in all embodiments and it is possible that the distal end 251 may extend beyond or be recessed relative to the plane Q-Q in other embodiments, one example of which will be described below with reference to FIG. 8.

The axis F-F along which the third portion 250 extends and the axis C-C along which the first leg 231 of the second portion 230 extends diverge with increasing distance from the plane P-P as those axes C-C, F-F extend in a direction away from the plane P-P towards the bent portion 236 and the distal end 251, respectively. Thus, while the first leg 231 of the second portion 230 extends upwardly from the first end 213 of the first portion 210, the third portion 250 extends downwardly from the second end 214 of the first portion 210.

Figure 6A:
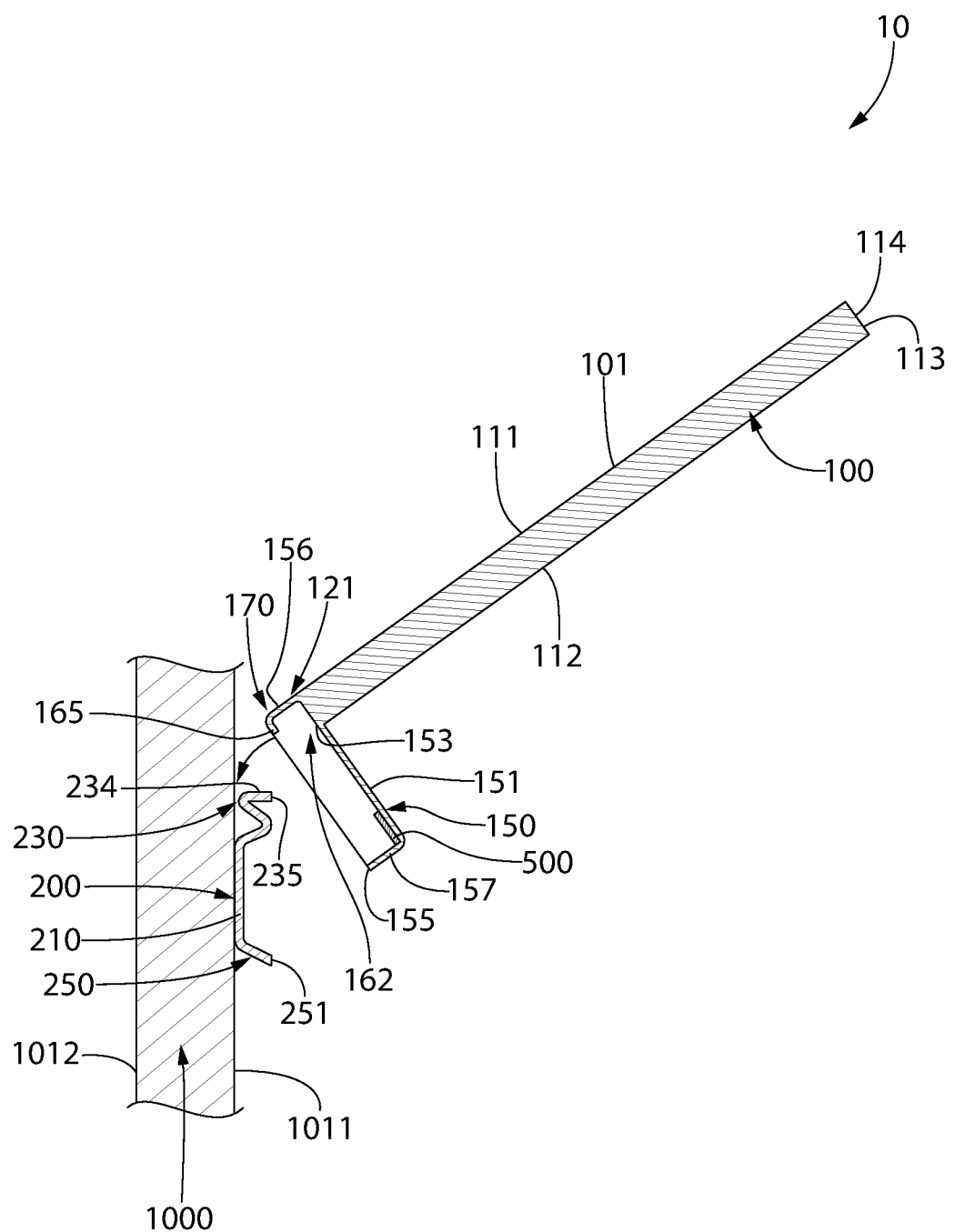
FIGS. 6A-6C are schematic cross-sectional views taken along line VI-VI of FIG. 2 illustrating the manner in which the shelf of FIG. 3 is mounted to the mounting bracket of FIG. 5.
Figure 6B:
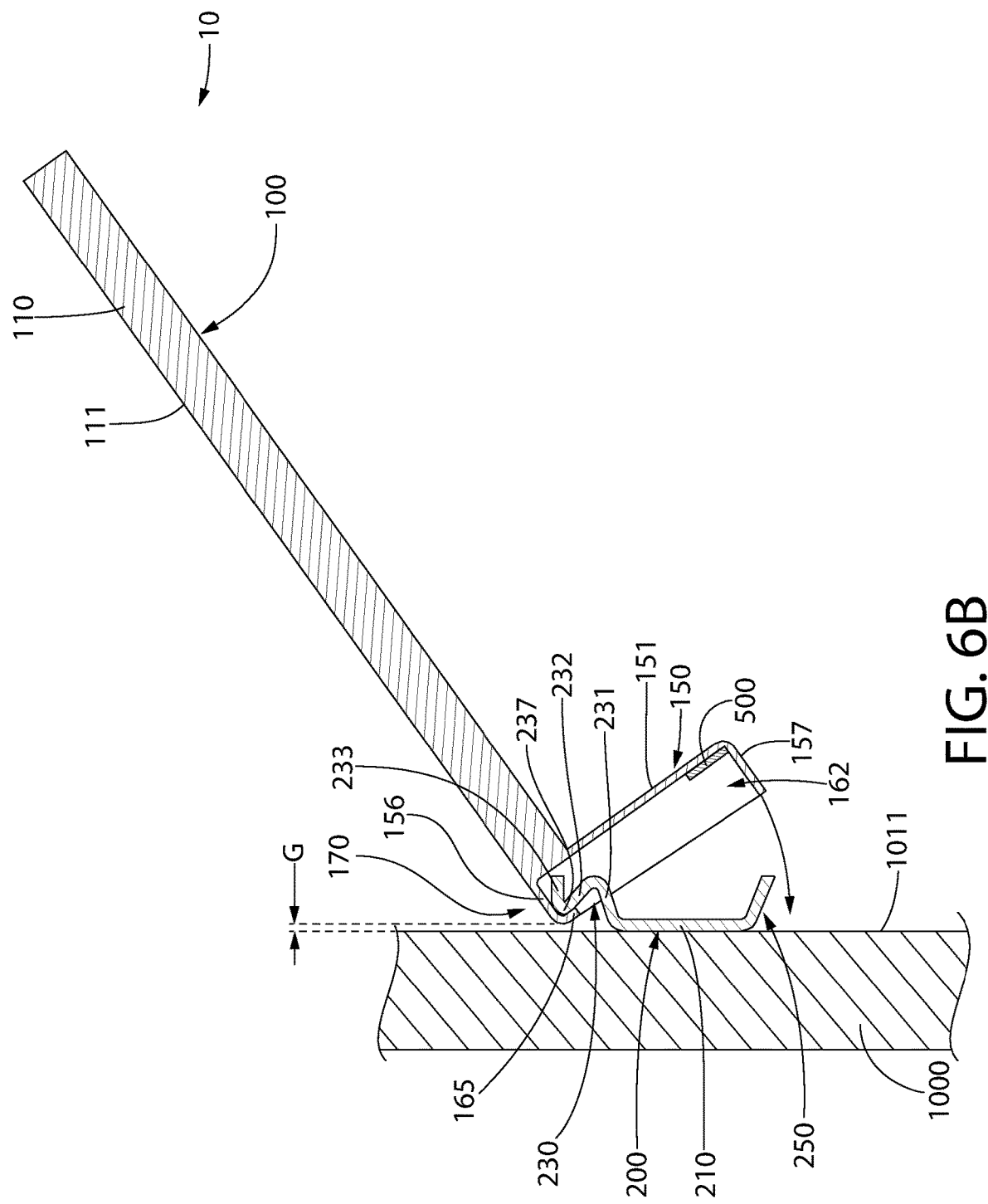
Figure 6C:
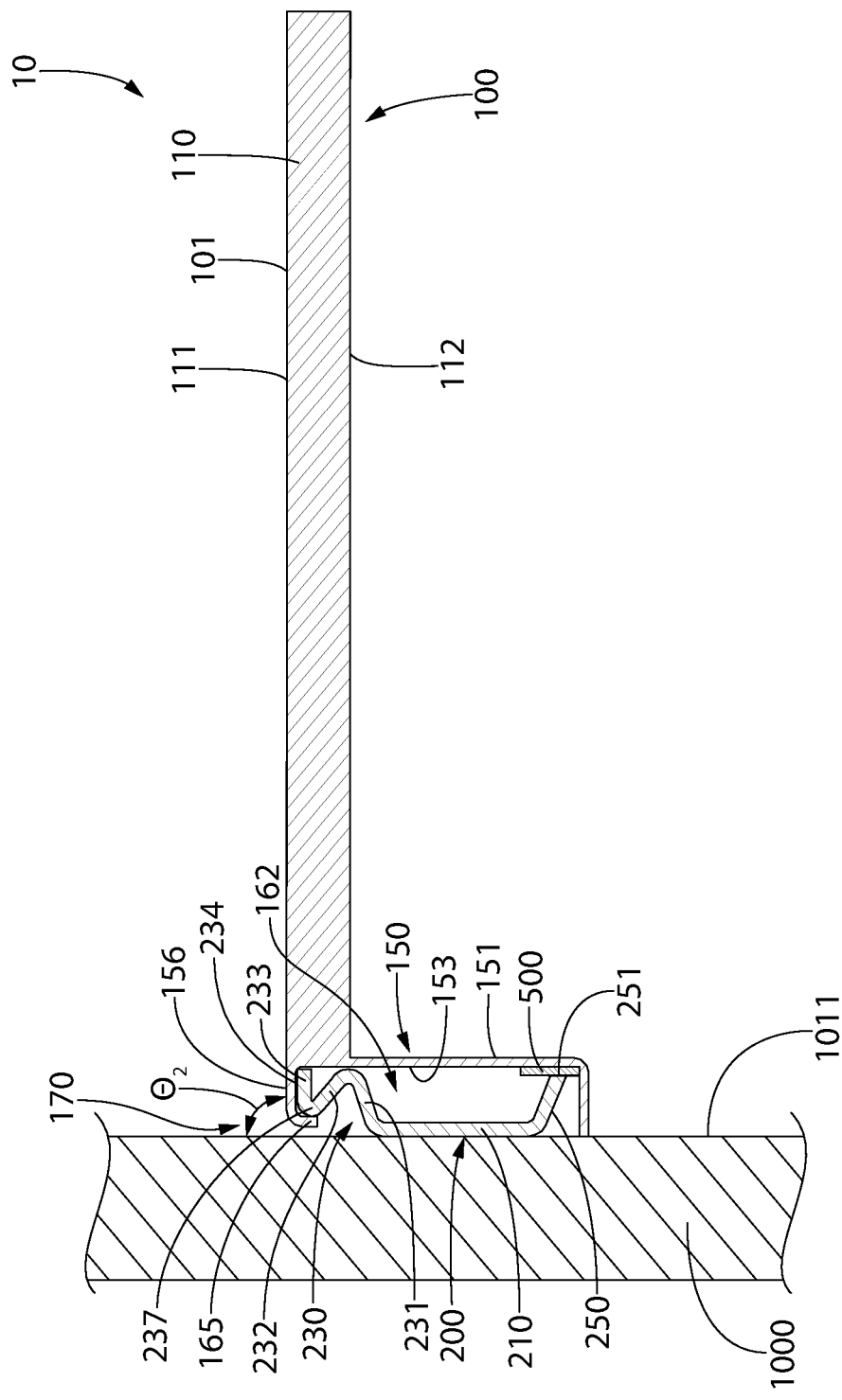

Referring to FIGS. 6A-6C, the process or method of installing the floating shelf apparatus 10 on the wall 1000 will be described. Although not shown in this embodiment, the first step may be to couple the first adhesive component 400 either to the wall 1000 or to the rear surface 212 of the first portion 210 of the mounting bracket 200. Either way, the first adhesive component 400 will be disposed between the rear surface 212 of the first portion 210 of the mounting bracket 200 and the first surface 1011 of the wall 1000, although this is not illustrated in this embodiment (it is illustrated in the embodiment depicted in FIGS. 8A-8C, described below, and it should be appreciated that the first adhesive component 400 may be included in this embodiment as well).

Next, the fasteners 300 are inserted through the mounting holes 290 in the mounting bracket 200 to couple the mounting bracket 200 to the wall 1000. The fasteners 300 may also extend through mounting holes 490 in the first adhesive component 400, illustrated in FIG. 1, although the mounting holes 490 may not be required in all embodiments. In FIG. 6A, the mounting bracket 200 is already coupled to the wall 1000 and the shelf 100 is being held in preparation for mounting to the mounting bracket 200. In that regard, the shelf 100 is positioned with the mounting portion 150 adjacent to the mounting bracket 200 to facilitate the mounting of the shelf 100 to the mounting bracket 200.

Next, referring to FIG. 6B, the mounting portion 150 of the shelf 100 is moved towards the mounting bracket 200 so that the mounting element 170 of the mounting portion 150 of the shelf 100 engages the second portion 230 of the mounting bracket 200. Specifically, the flange portion 165 of the mounting element 170 is inserted into the gap G that exists between the second bent portion 237 of the second portion 230 of the mounting bracket 200 and the first surface 1011 of the wall 1000 (which lies in the plane P-P). In this position, the mounting element 170 wraps around the second bent portion 237 of the second portion 230 of the mounting bracket 200 and the top surface 111 of the ledge portion 110 of the shelf 100 extends upwardly at an oblique angle relative to the first surface 1011 of the wall 1000. During this procedure, the ledge portion 110 is held at an angle relative to the wall 1000 so that an acute angle is formed between the front surface 1011 of the wall 1000 and the top surface 111 of the ledge portion 110.

FIG. 6C illustrates the floating shelf apparatus 10 in the fully assembled state with the shelf 100 mounted to the mounting bracket 200 and the mounting bracket 200 coupled to the wall 1000. Moving from FIG. 6B to FIG. 6C in the assembly process, the shelf 100 rotates downwardly until the top surface 111 of the ledge portion 110 of the shelf 100 is oriented at an approximately perpendicular angle relative to the first surface 1011 of the wall 1000 (an approximately perpendicular angle including angles that are between 87° and 93° relative to the first surface 1011 of the wall 1000). When the shelf 100 is mounted to the mounting bracket 200, the mounting bracket 200 is located within the mounting cavity 162 of the mounting portion 150 of the shelf 100. In the exemplified embodiment, an entirety of the mounting bracket 200 is located within the mounting cavity 162, although in other embodiments only portions of the mounting bracket 200 may be located within the mounting cavity 162. However, it is preferable that the mounting bracket 200 be entirely concealed by the shelf 100 to provide the shelf with the appearance that it is "floating" or "suspended" on the wall 1000.

Furthermore, the upper portion 156 of the sidewall 154 (which forms a portion of the mounting element 170) rests atop of the top surface 234 of the third leg 233 of the second portion 230 of the mounting bracket 200 (said top surface 234 also forming the top surface of the mounting bracket 200). Furthermore, the flange portion 165 of the mounting element 170 extends into the gap G between the bent portion 237 and the wall 1000. Thus, the mounting element 170 of the mounting portion 150 of the shelf 100 rests atop the third leg 233 of the second portion 230 of the mounting bracket 200 and extends into the gap G between the bent portion 237 of the second portion 230 of the mounting bracket 200 and the wall 1000 or plane P-P. This interaction between the mounting element 170 of the mounting portion 150 of the shelf 100 and the second portion 230 of the mounting bracket 200 achieves a mounting of the shelf 100 to the mounting bracket 200. In this position, the shelf 100 is supported on the wall 1000 by the mounting bracket 200 which is coupled to the wall 1000.

Because the inner surface of the mounting element 170 is curved between the flange portion 165 and the upper portion 156 of the sidewall 154, the shelf 100 can pivot/rotate upwardly and downwardly until it is essentially locked into position. Specifically, the curved inner surface of the mounting element 170 can rotate/pivot around the second bent portion 237 of the mounting bracket, as shown in FIGS. 6B and 6C.

In addition to the above, when the shelf 100 is mounted to the mounting bracket 200 as shown in FIG. 6C, the distal end 251 of the third portion 250 of the mounting bracket 200 contacts or otherwise engages the second adhesive component 500 that is located on the rear surface 153 of the vertical wall 151 of the mounting portion 150 of the shelf 100. The contact between the distal end 251 of the third portion 250 of the mounting bracket 200 and the second adhesive component 500 stops disassembly of the shelf 100 relative to the mounting bracket 200 (i.e., locks the shelf 100 into place relative to the mounting bracket 200). Specifically, without having the mounting bracket 200 contact the second adhesive component 500, applying an upward force onto the bottom surface 112 of the ledge portion 110 of the shelf 100 would cause the shelf 100 to tilt/rotate upwardly. However, because the third portion 250 of the mounting bracket 200 contacts the second adhesive component 500, this creates a coupling or adhesive bond between the third portion 250 of the mounting bracket 200 and the lower part of the mounting portion 150 of the shelf 100 via the second adhesive component 500, which prevents such tilting of the shelf 100 even if bumped as noted above.

As noted above, in some embodiments the lower portion 157 of the sidewall 154 of the mounting portion 150 of the shelf 100 has a greater length than the upper portion 156 of the sidewall 154 of the mounting portion 150 of the shelf 100. Thus, when the shelf 100 is mounted to the mounting bracket 200, the lower portion 157 of the sidewall 154 will cause the shelf 100 to be inclined relative to the wall 1000 rather than being perpendicular to the wall 1000. However, because the difference in the lengths between the lower and upper portions 157, 156 of the sidewall 154 is small (i.e., 1-2 mm), the angle θ2 of the shelf 100 relative to the wall 1000 may be between 85° and 89°, and more specifically between 87° and 89°. Of course, in other embodiments the shelf 100 may be oriented perfectly or approximately perpendicular relative to the first surface 1011 of the wall 1000.

Figure 7:
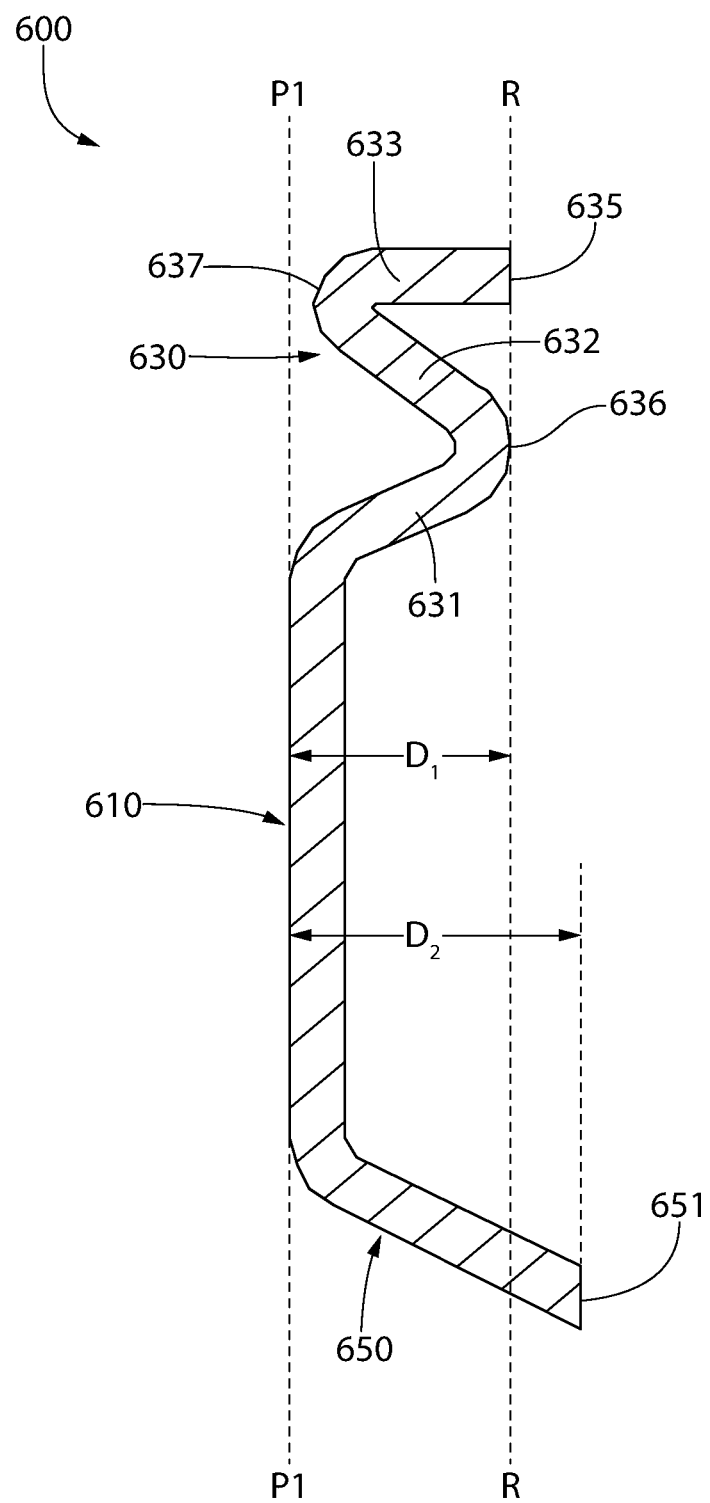
FIG. 7 is a cross-sectional view of a mounting bracket of the floating shelf apparatus taken along line V-V of FIG. 1 in accordance with an alternative embodiment of the present invention.

Referring now to FIG. 7, a mounting bracket 600 is illustrated in accordance with an alternative embodiment of the present invention. The mounting bracket 600 is very similar to the mounting bracket 200 except for the differences described herein. Thus, the features and components of the mounting bracket 600 will be similarly numbered to the mounting bracket 200 except that the 600-series of numbers will be used. For similarly numbered features, it should be appreciated that the description provided above with regard to the mounting bracket 200 is applicable unless specifically stated otherwise herein.

The mounting bracket 600 comprises a first portion 610, a second portion 630, and a third portion 650. The second portion 630 comprises a first leg 631, a second leg 632, and a third leg 633. The first and second portions 610, 630 of the mounting bracket 600 are identical to the first and second portions 210, 230 of the mounting bracket 200. In this embodiment, the distal end 635 of the third leg 633 is aligned with the first bent portion 636 (i.e., they lie in a common plane R-R). However, in this embodiment the distal end 651 of the third mounting portion 650 is not also aligned with the distal end 635 of the third leg 633. Rather, the third mounting portion 650 extends through and beyond the plane R-R. Stated another way, in this embodiment the rear surface 612 of the first portion 610 of the mounting bracket 600 lies in a plane P1-P1. The distal end 635 of the third leg 633 is located a first distance D1 from the plane P1-P1 and the distal end 651 of the third portion 650 is located a second distance D2 from the plane P1-P1, the second distance D2 being greater than the first distance D1. As can be seen, the first and second distances D1, D2 are measured in a direction that is perpendicular to the plane P1-P1.

Figure 8A:
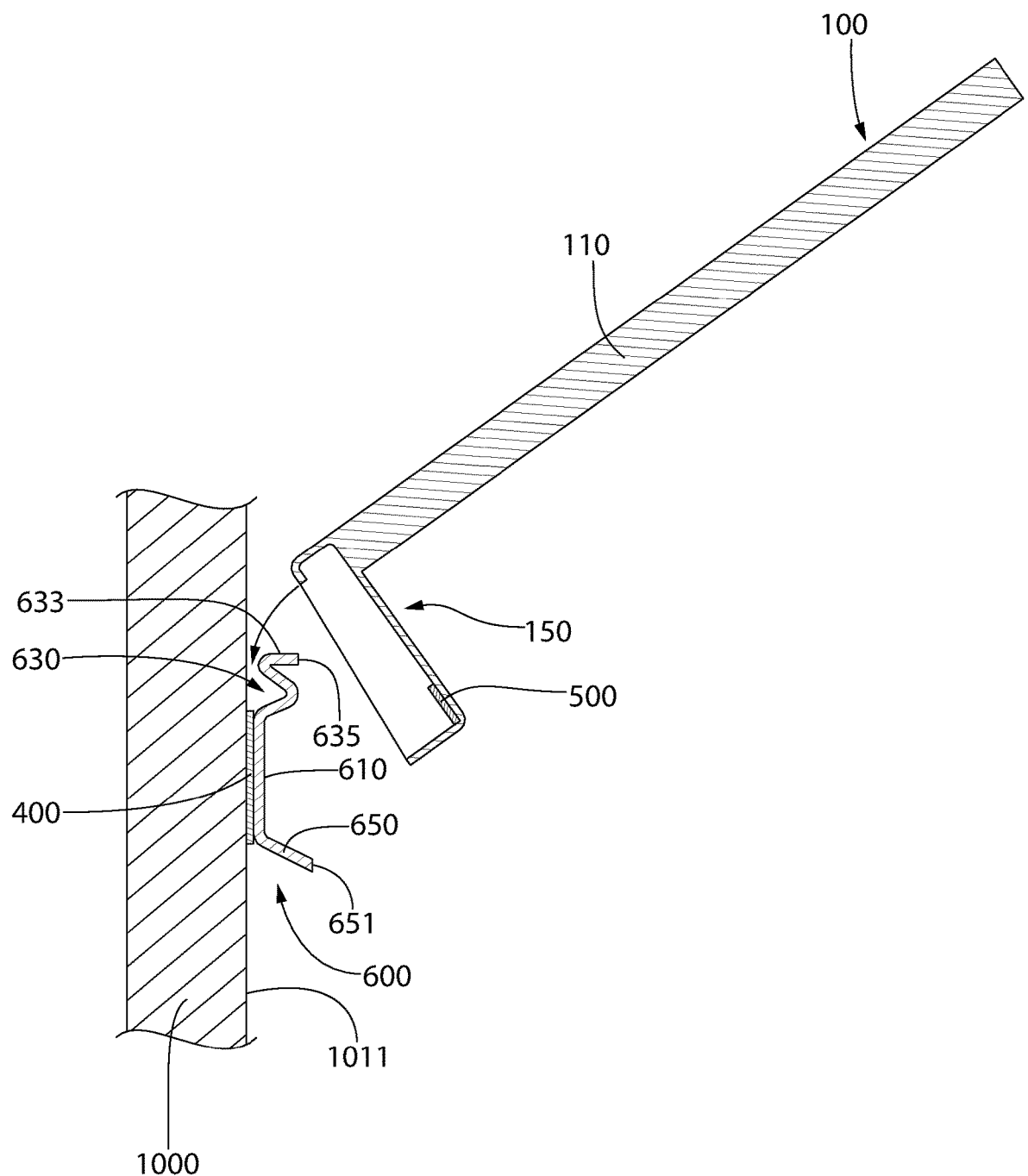
FIGS. 8A-8C are schematic cross-sectional views taken along line VI-VI of FIG. 2 illustrating the manner in which the shelf of FIG. 3 is mounted to the mounting bracket of FIG. 7.
Figure 8B:
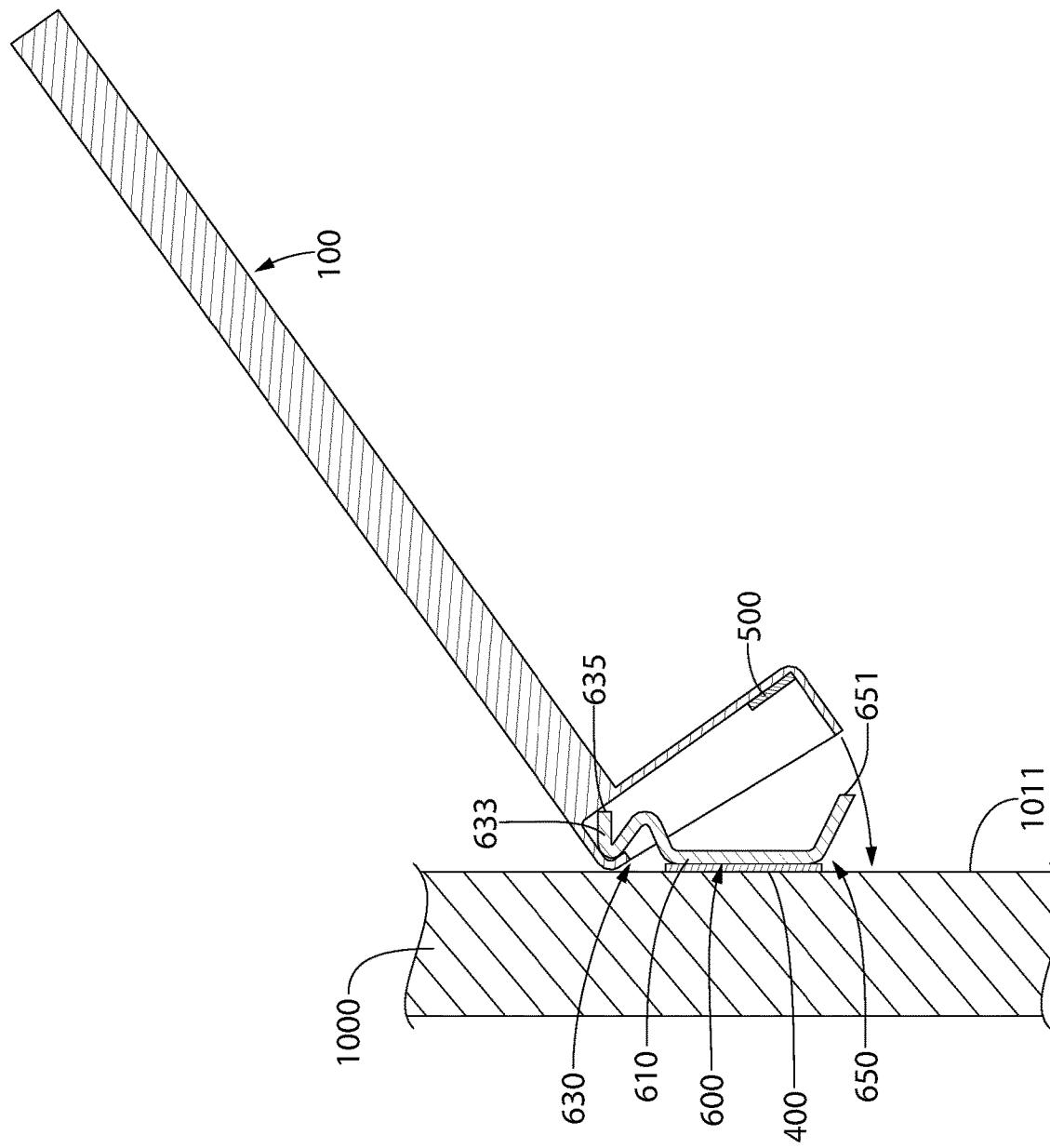
Figure 8C:
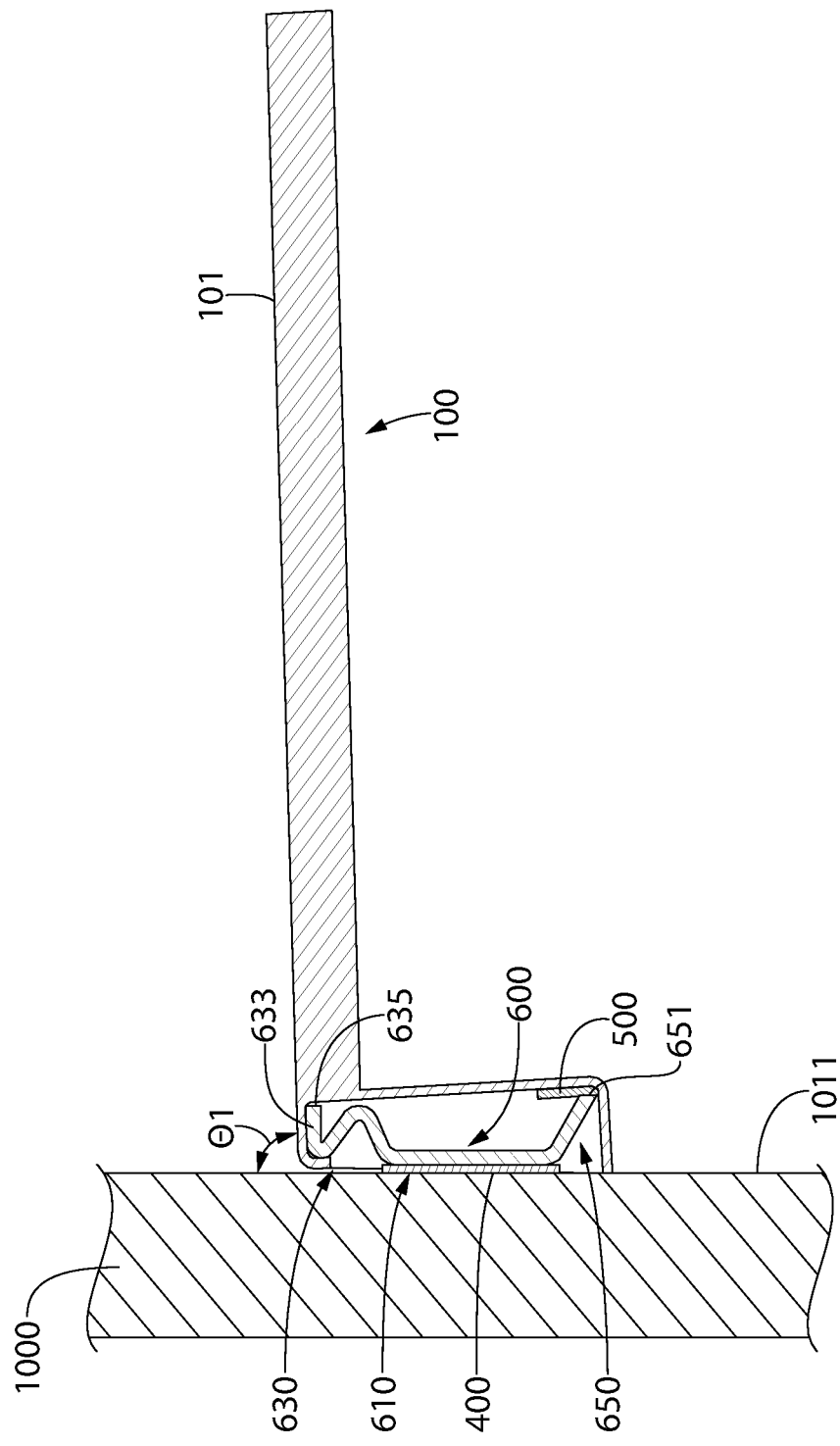

FIGS. 8A-8C illustrate the manner in which the shelf 100 is mounted to the mounting bracket 600. This process is identical to the process described above with regard to FIGS. 6A-6C and thus a detailed description will not be provided herein the interest of brevity, but rather the drawings can speak for themselves along with a review of the description of FIGS. 6A-6C. However, it will be mentioned that in FIGS. 8A-8C, the first adhesive component 400 is illustrated between the mounting bracket 600 and the wall 1000 and that the first adhesive component 400 can be similarly positioned in the embodiment of FIGS. 6A-6C.

Furthermore, the only difference in FIGS. 8A-8C relative to that shown and described with reference to FIGS. 6A-6C is that because D2 is greater than D1, the top surface 101 of the shelf 100 may be at a slightly greater upwardly inclined angle relative to the wall 1000. Specifically, the distal end 651 of the third portion 650 of the mounting bracket 600 being spaced further from the wall 1000 than the distal end 635 of the third leg 633 of the second portion 630 of the mounting bracket 600 may cause the top surface 101 of the shelf 100 to be angled relative to the wall 1000. The angle θ1 may be between 85° and 89° in some embodiments.

Figure 9:
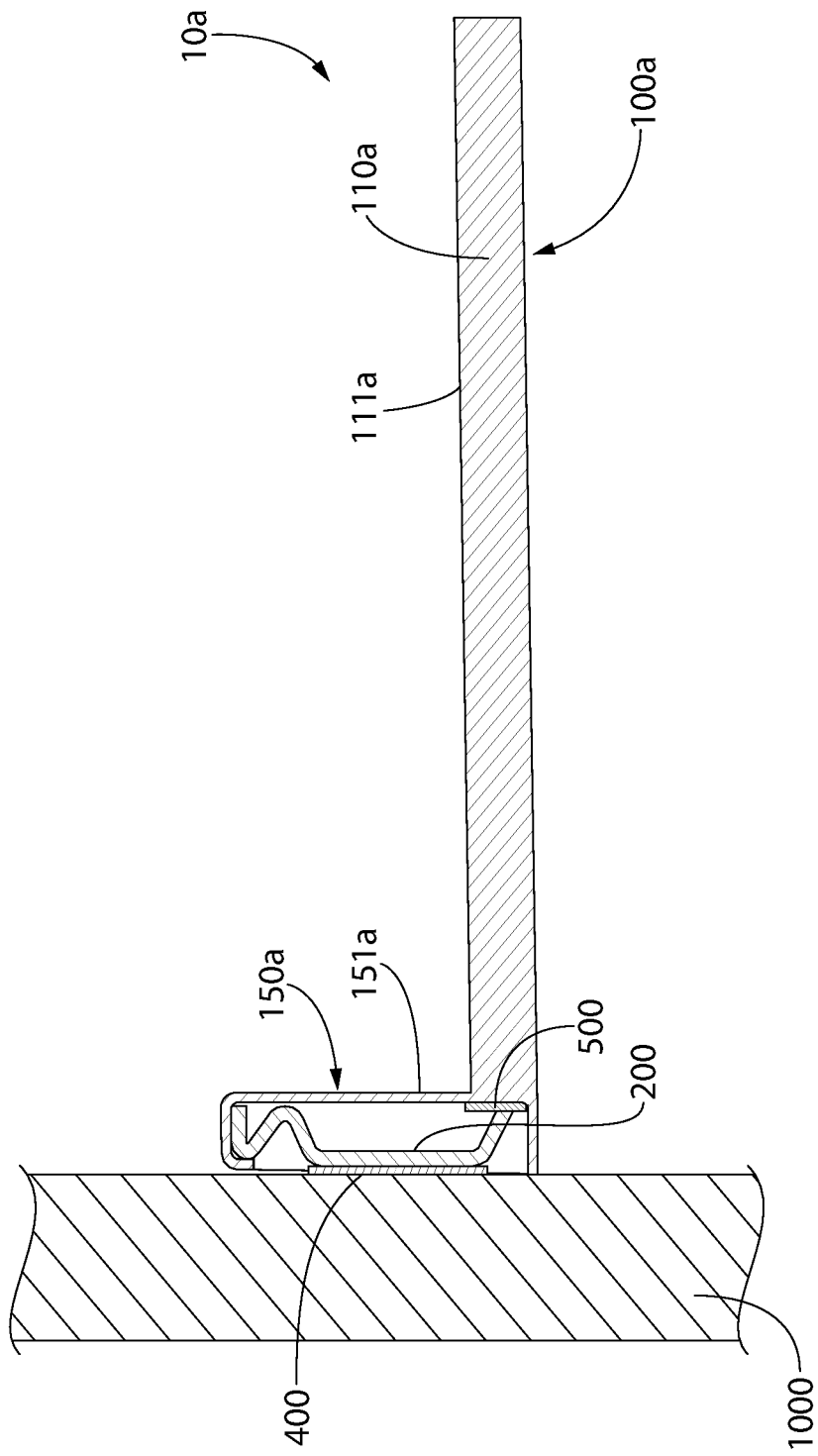
FIG. 9 is a cross-sectional view taken along line VI-VI of FIG. 2 in accordance with another embodiment of the present invention.

FIG. 9 illustrates an alternative embodiment of a floating shelf apparatus 10a whereby the mounting bracket 200 is used to mount a shelf 100a to the wall 1000. Thus, the mounting bracket 200 is the one previously described, but the shelf 100a has a slightly different configuration. Specifically, in this embodiment the vertical wall 151a of the mounting portion 150a extends upwardly from the top surface 111a of the ledge portion 110a of the shelf 100a rather than downwardly from the bottom surface as with the shelf 100 that was previously described. Other than this minor difference, the shelf 100a is identical to the shelf 100 and thus the description provided above is applicable and the shelf 100a will not be described in greater detail in the interest of brevity.

Figure 10:
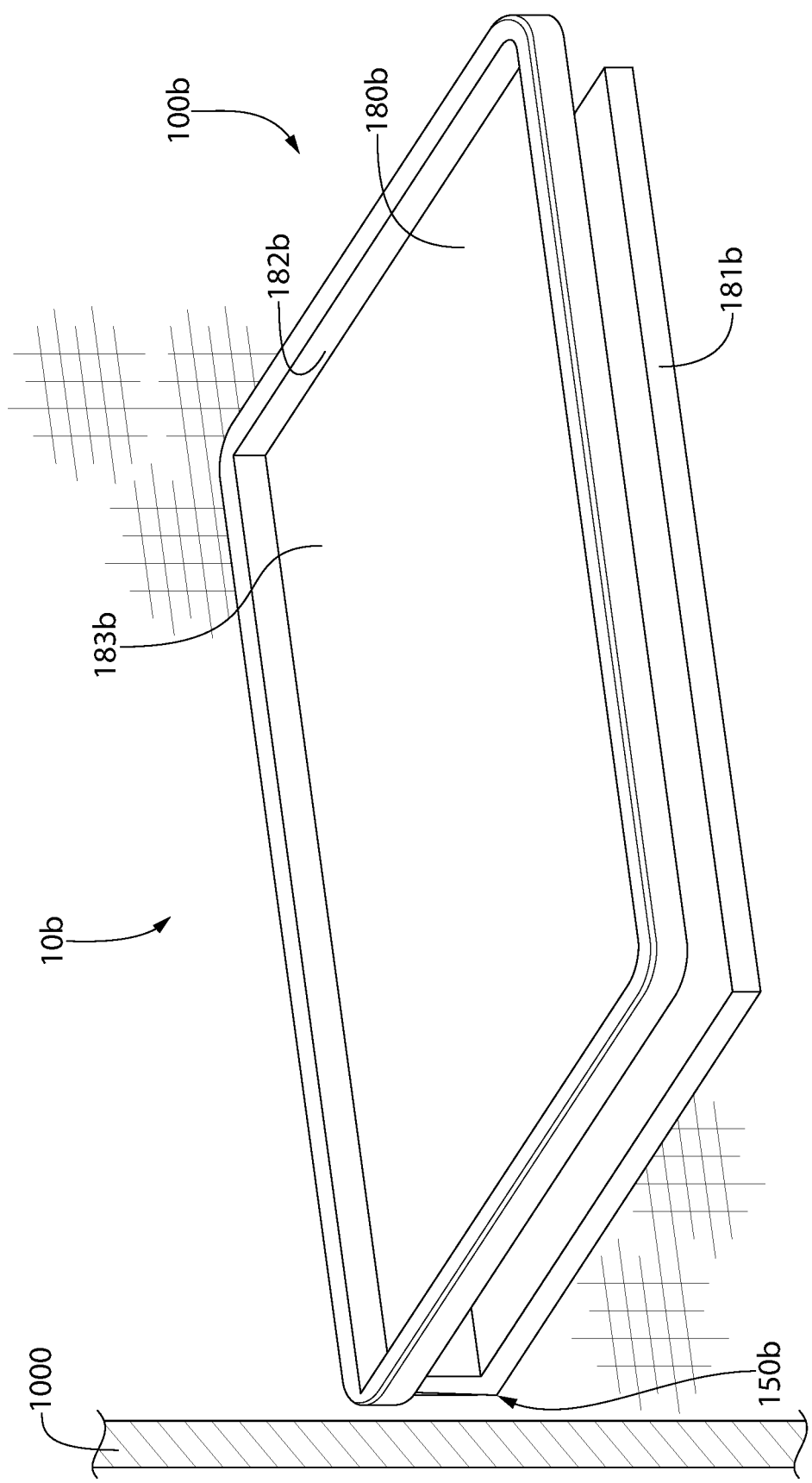
FIG. 10 is a perspective view of a floating shelf apparatus in accordance with another embodiment of the present invention.

Finally, referring to FIG. 10, a floating shelf apparatus 10b is illustrated in still another embodiment in an assembled state. In this embodiment, the mounting bracket is not visible, but it should be appreciated that it may be identical to the mounting bracket 200 or the mounting bracket 600 previously described herein. In this embodiment, the floating shelf apparatus 10b comprises a shelf 100b that is different in structure than the shelves 100, 100a described previously. Specifically, in this embodiment the ledge portion 110b of the shelf 100b is two-tiered such that it includes an upper ledge 180b and a lower ledge 181b that are spaced apart from one another by a gap. The upper ledge 180b comprises a top surface 183b and a wall 182b protruding upwardly from the top surface 183b along the perimeter of the upper ledge 180b. The wall 182b may prevent items from rolling or falling off of the upper ledge 180b. The mounting of the shelf 100b to the mounting bracket 200, 600 is identical to that which has been described above. Thus, the shelf 100b includes a mounting portion 150b that is identical the mounting portion 150 of the shelf 100 described above.

While the foregoing description and drawings represent the exemplary embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed is:

1. A floating shelf apparatus comprising:
a shelf comprising a ledge portion and a mounting portion, the mounting portion comprising a mounting element and a mounting cavity having an open rear end;
a mounting bracket comprising:
a first portion having a front surface and a rear surface opposite the front surface, the first portion extending from a first end to a second end along a longitudinal axis, wherein the first portion is configured to couple the mounting bracket to a wall with the rear surface of the first portion facing the wall;
a second portion having a first leg that extends from the first end of the first portion in an upward direction that is oblique to the front surface of the first portion; and
a third portion extending from the second end of the first portion in a downward direction that is oblique to the front surface of the first portion; and
wherein the second and third portions of the mounting bracket are located within the mounting cavity of the mounting portion of the shelf and the mounting element of the mounting portion of the shelf interacts with the second portion of the mounting bracket to mount the shelf to the mounting bracket and hang the shelf from the wall;
wherein the rear surface of the first portion of the mounting bracket lies in a plane, and wherein the second portion of the mounting bracket comprises:
the first leg extending from the first portion of the mounting bracket in the upward direction away from the plane and being oblique to the plane;
a second leg extending from the first leg in a direction towards the plane and being oblique to the plane; and
a third leg extending from the second leg in a direction away from the plane and being perpendicular to the plane.

2. The floating shelf apparatus according to claim 1 wherein the mounting portion of the shelf comprises a vertical wall having a front surface and a rear surface opposite the front surface and a sidewall extending from the rear surface of the vertical wall to a distal end, the rear surface of the vertical wall and an inner surface of the sidewall collectively defining the mounting cavity, wherein the ledge portion of the shelf extends from the front surface of the vertical wall.

3. The floating shelf apparatus according to claim 2 wherein the mounting element of the mounting portion of the shelf comprises:
an upper portion of the sidewall that is parallel to a top surface of the ledge portion; and
a flange portion extending from the distal end of the upper portion of the sidewall into the mounting cavity.

4. The floating shelf apparatus according to claim 3 wherein an outer surface of the upper portion of the sidewall is flush with the top surface of the ledge portion so that the outer surface of the upper portion of the sidewall and the top surface of the ledge portion collectively form a support surface of the shelf.

5. The floating shelf apparatus according to claim 3 wherein the upper portion of the sidewall of the mounting portion of the shelf has a first length measured from the vertical wall to the distal end and a lower portion of the sidewall of the mounting portion of the shelf has a second length measured from the vertical wall to the distal end, the second length being greater than the first length.

6. The floating shelf apparatus according to claim 2 further comprising an adhesive component on a portion of the rear surface of the vertical wall.

7. The floating shelf apparatus according to claim 6 wherein the adhesive component is a double-sided tape.

8. The floating shelf apparatus according to claim 6 wherein the mounting element of the mounting portion of the shelf rests atop a top surface of the mounting bracket and a distal end of the third portion of the mounting bracket contacts the adhesive component to fasten the shelf to the mounting bracket.

9. The floating shelf apparatus according to claim 1 wherein the shelf is formed from stainless steel.

10. The floating shelf apparatus according to claim 1 wherein the second portion of the mounting bracket comprises a bent portion at a junction between the second and third legs, the bent portion facing the plane and being spaced apart from the plane by a gap.

11. The floating shelf apparatus according to claim 10 wherein the mounting element of the mounting portion of the shelf rests atop the third leg of the second portion of the mounting bracket and extends into the gap between the bent portion of the second portion of the mounting bracket and the plane.

12. The floating shelf apparatus according to claim 1 further comprising a double-sided adhesive tape positioned between the rear surface of the first portion of the mounting bracket and the wall.

13. The floating shelf apparatus according to claim 1 wherein the first portion of the mounting bracket comprises at least one mounting hole, and further comprising one or more fasteners extending through the mounting hole to couple the mounting bracket to the wall.

14. The floating shelf apparatus according to claim 1 wherein the second portion of the mounting bracket is an S-shaped portion that extends upwardly from the first end of the first portion of the mounting bracket, and wherein the third portion of the mounting bracket is a linear portion that extends downwardly from the second end of the first portion of the mounting bracket.

15. The floating shelf apparatus according to claim 1 wherein a top surface of the second portion of the mounting bracket is oriented generally parallel to opposing top and bottom surfaces of the ledge portion of the shelf, the top surface of the second portion of the mounting bracket forming a top surface of the mounting bracket.

16. A floating shelf apparatus comprising:
a shelf comprising a ledge portion and a mounting portion, the mounting portion comprising a mounting element;
a mounting bracket comprising:
a first portion configured to be coupled to a wall with a rear surface of the first portion facing the wall, the rear surface lying in a plane; and
a second portion comprising:
a first leg extending upwardly from a first end of the first portion in a direction away from the plane and being oblique to the plane;
a second leg extending upwardly from the first leg in a direction towards the plane and being oblique to the plane; and
a third leg extending from the second leg in a direction away from the plane and being perpendicular to the plane; and
wherein the mounting element of the shelf interacts with the third leg of the second portion of the mounting bracket to mount the shelf to the mounting bracket and hang the shelf from the wall;
wherein the mounting portion of the shelf comprises a mounting cavity having a floor and an open rear end, a double-sided adhesive tape located on a portion of the floor of the mounting cavity, wherein the mounting bracket comprises a third portion extending downwardly from the first portion at a second end of the first portion in a direction away from the plane and being oblique to the plane, wherein a distal end of the third portion of the mounting bracket is coupled to the double-sided adhesive tape to fasten the shelf to the mounting bracket.

17. The floating shelf apparatus according to claim 16 wherein the second portion of the mounting bracket comprises a bent portion at a junction between the second and third legs, the bent portion facing the plane and being spaced apart from the plane by a gap, wherein the mounting element of the mounting portion of the shelf rests atop the third leg of the second portion of the mounting bracket and extends into the gap between the bent portion of the second portion of the mounting bracket and the plane.

18. A floating shelf apparatus comprising:
a shelf comprising a ledge portion and a mounting portion, the mounting portion comprising a mounting element;
a mounting bracket comprising:
a first portion configured to be coupled to a wall with a rear surface of the first portion facing the wall, the rear surface lying in a plane; and
a second portion extending obliquely from the first portion and comprising a flat top surface that is generally perpendicular to the plane, the top surface transitioning into a bent portion that faces the plane and is spaced apart from the plane by a gap; and
wherein the mounting element of the shelf comprises a first portion that rests atop the top surface of the second portion of the mounting bracket in a flat-to-flat interface, and a second portion that extends downwards into the gap between the bent portion of the second portion of the mounting bracket and the plane to mount the shelf to the mounting bracket.

19. A floating shelf apparatus according to claim 18, wherein the second portion of the mounting element of the shelf is spaced apart from the wall after the shelf is mounted to the mounting bracket.

20. A floating shelf apparatus comprising:
a shelf comprising a ledge portion and a mounting portion, the mounting portion comprising a mounting element and a mounting cavity having an open rear end;
a mounting bracket comprising:
a first portion having a front surface and a rear surface opposite the front surface, the first portion extending from a first end to a second end along a longitudinal axis, wherein the first portion is configured to couple the mounting bracket to a wall with the rear surface of the first portion facing the wall;

a second portion having a first leg that extends from the first end of the first portion in an upward direction that is oblique to the front surface of the first portion; and a third portion extending from the second end of the first portion in a downward direction that is oblique to the front surface of the first portion; and wherein the second and third portions of the mounting bracket are located within the mounting cavity of the mounting portion of the shelf and the mounting element of the mounting portion of the shelf interacts with the second portion of the mounting bracket to mount the shelf to the mounting bracket and hang the shelf from the wall;

wherein the second portion of the mounting bracket is an S-shaped portion that extends upwardly from the first end of the first portion of the mounting bracket, and wherein the third portion of the mounting bracket is a linear portion that extends downwardly from the second end of the first portion of the mounting bracket.

\* \* \* \* \*